United States Patent [19]

Gefroerer et al.

[11] 4,433,411
[45] Feb. 21, 1984

[54] TELEPHONE SWITCHING NETWORK FOR DIGITAL SPEECH TRANSMISSION

[75] Inventors: Stanislaus Gefroerer, Taufkirchen; Werner Vollmeyer, Munich, both of Fed. Rep. of Germany

[73] Assignee: Siemens Aktiengesellschaft, Berlin & Munich, Fed. Rep. of Germany

[21] Appl. No.: 302,642

[22] Filed: Sep. 15, 1981

[30] Foreign Application Priority Data

Sep. 29, 1980 [DE] Fed. Rep. of Germany ....... 3036649

[51] Int. Cl.³ .............................................. H04J 3/16
[52] U.S. Cl. ........................................ 370/80; 370/81; 370/94; 370/60
[58] Field of Search ...................... 370/60, 81, 94, 80, 370/79, 91, 92

[56] References Cited

U.S. PATENT DOCUMENTS 3,644,680 2/1972 Amano et al. ......................... 370/81
3,749,845 7/1973 Fraser ................................... 370/80
4,100,377 7/1978 Flanagan ............................... 370/91

Primary Examiner—Gerald L. Brigance
Attorney, Agent, or Firm—Hill, Van Santen, Steadman & Simpson

[57] ABSTRACT

A telephone switching network for digital speech transmission is characterized in that a dialing information input by an originating subscriber into an originating switching center is employed to complete a virtual connection departing from the originating switching center and proceeding over one or more tandem switching centers, as required, and extending up to a destination switching center to which an appertaining destination subscriber is connected. A speech information to be transmitted is subdivided into speech segments or phrases and a respective phrase, in the form of an information block having a preceding destination identifier sequence which contains data concerning virtual partial connections to be respectively traversed and an end identifier at the end of the phrase and indicating the end of the phrase, is transmitted in proper time between the subscribers via real partial connections respectively built-up for an appertaining, current phrase between two switching centers. The virtual connection is disconnected after termination of the call.

21 Claims, 4 Drawing Figures

TELEPHONE SWITCHING NETWORK FOR DIGITAL SPEECH TRANSMISSION

BACKGROUND OF THE INVENTION

1. Field of the Invention

The present invention relates to telephone systems, and is particularly concerned with a telephone switching network for digital speech transmission.

2. Description of the Prior Art

The transmission of digitized speech signals in telephone networks is gaining increasing significance, both because of the advantages connected therewith for switching technology and for transmission technology per se.

In previously-known telephone networks for digital speech transmission, as well as in analog networks, connections between two respective subscribers are generally interconnected for the entire duration of a call. Given increasing density of such networks or, respectively, given increasing numbers of subscribers, the difficulties with respect to the number of available channels increase.

It is known that a voice connection for an individual speech is usually exploited over time only to a slight degree, since, on the one hand, the call partners usually speak alternately and, on the other hand, the verbal flow of the individual partner does not proceed continuously. Even in a short monologue, speech pauses respectively occur during which the appertaining voice connection is, indeed, not required. This fact, as is known, is advantageously exploited by means of methods for saving channel capacity, particularly in cost-intensive connection segments, for example, transatlantic cables, satellite connections and the like. The TASI (time assigned speech interpolation) method represents a method which is known and proven in this respect.

In the speech interpolation which is undertaken in the known TASI method, a respective channel is through-connected for an appertaining voice connection when there is actual speaking in the appertaining direction. In all other time intervals, the channel capacity is available for further, individual voice connections. It can be seen, that the fact according to which a traditional speech connection according to the conditions described above is only required from time-to-time during a conversation is advantageously exploited by means of such a method for improved exploitation of the channels. The existing transmission capacity of a line group can be exploited far better with speech interpolation. It is possible, for example, to load a group consisting of 35 or more lines with approximately twice as many calls as is conventionally possible.

Given connections having paths which are through-connected in time sections for a short speech phase, one refers to so-called virtual connections. According to standard methods, speech interpolation always requires a brief intermediate storage of digital signals which are formed and represent so-called speech phases or phrases. Therefore, it must be seen to that the upper limit of the transmission time from subscriber-to-subscriber, which is fixed at 400 ms, is not exceeded. If one takes into consideration that a satellite section already uses 300 ms transmission time, then only approximately 100 ms time remains for the other sections. This fact is of special significance, particularly for world-wide speech connections.

The known methods of speech interpolation are fundamentally employed section-wise, for example, between two switching centers. For this purpose, each of the two switching centers has a group of outgoing channels available from which it allots the channels to the message transmitters, as required. In a complete telephone network, in contrast thereto, a star-shaped, or even a meshed network, usually exists and a connection usually comprises a number of sections. Because of the required intermediate storage time per section, however, far too great a transit time would occur given a plurality of sections (up to 12). This situation would therefore not be able to lead to a realistic solution.

SUMMARY OF THE INVENTION

The object of the present invention is to create a telephone switching network in which the speech is digitally transmitted and in which it can be achieved, with relatively simple means or measures, that the advantages of speech interpolation also be used where connections for transmission can connect subscribers who are exchanging information with one another over long distances and in random directions, extending over various switching centers.

The above object is achieved, according to the invention, by means of a telephone switching network for digital speech transmission which is characterized in that a dialing information input into an originating switching center by an originating subscriber is employed for the purpose of completing a virtual connection departing from the originating switching center, extending over one or more transit switching centers as needed and extending up to a destination switching center, at which an appertaining destination subscriber is connected. Speech information to be transmitted is subdivided into speech sections or phrases and a respective phrase, in the form of an information block with a preceding destination identifier sequence which contains instructions concerning respective virtual partial connections to be traversed and with an end identifier placed at the end of the phrase and indicating the end is transmitted in proper time by way of the respective, real partial connection, completed for an appertaining, current phrase between two switching centers. The virtual connection is disconnected after termination of the call.

The invention offers the advantage that the method of speech interpolation which is known per se can be employed in arbitrarily-designed telephone networks provided for the transmission of digital speech signals in order to save channel capacity without inadmissibly long transit times occurring between the subscribers.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
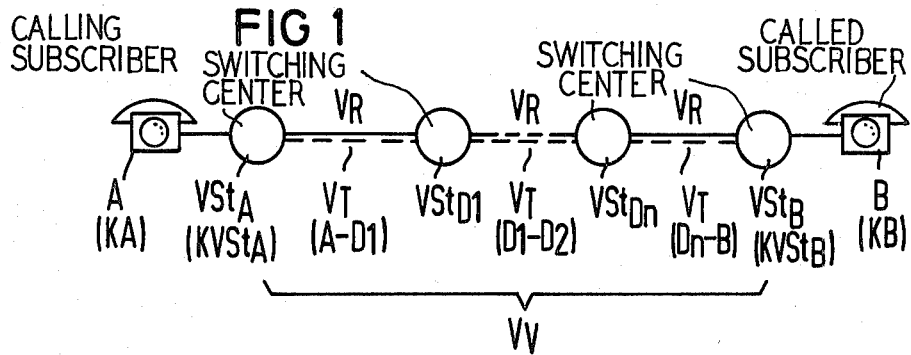
FIG. 1 schematically illustrates the structure of a telephone switching network according to the invention.

As already explained, FIG. 1 schematically illustrates the structure of a telephone switching network according to the present invention. A calling subscriber, in particular, the originating subscriber A, informs his switching center, the originating switching center $VSt_A$ of the number of the requested subscriber in the form of a dialing information W which contains a destination switching center identifier $KVSt_B$ and a destination subscriber identifier KB, the subscriber informing the switching center in a channel having a data transmission rate of 64 kbit/s by means of a call completion packet which, for example, is secured by means of a high data link control method HDLC which is known per se and which is referenced below as the connection beginning frame or beginning frame ("frame" here in the sense of an HDLC block carrying a useful information). At the same time or previously, a corresponding information interchange could, if necessary, occur in a separate subscriber signal circuit in order to ensure that the subscriber request in the 64 kbit/s circuit was received and acknowledged by the exchange.

The exchange does not, as is standard in circuit switching exchanges, connect a line for the connection but, rather, seeks a line group in the desired direction which exhibits sufficient free capacity and reports the virtual connection to the next switching center, for example, the first transit switching center $VSt_{D1}$, with a specially-identified and secured connection beginning frame. (A separate line can also be employed, for example, for the identification.) This start frame in FIG. 2 contains the identifiers for the called subscriber and for the calling subscriber, namely, an identification information I having the originating switching center identifier $KVSt_A$ and the originating subscriber identifier KA. Moreover, it contains an octet for the local identification, i.e. identification only understandable in this switching center, of the outgoing group. The two combinations 00000000 and 11111111 are not employed in this identification.

The local identification of a group, namely, the line group identifier $A-D_1$, corresponds to the local addressing of a direction and serves the purpose of path steering after construction of the virtual connection.

The next switching center, namely the switching center $VSt_{D1}$, "takes note of" the group from which the beginning frame came, reads the number of the destination switching center $VSt_B$ of the destination subscriber B, seeks the corresponding group, adds a respective octet to the beginning frame, again for local identification of the incoming group and of the outgoing group, and transmits the beginning frame onto a line of the selected outgoing group.

The following transit-switching centers $VSt_{Dn}$ occur likewise.

Figure 3:
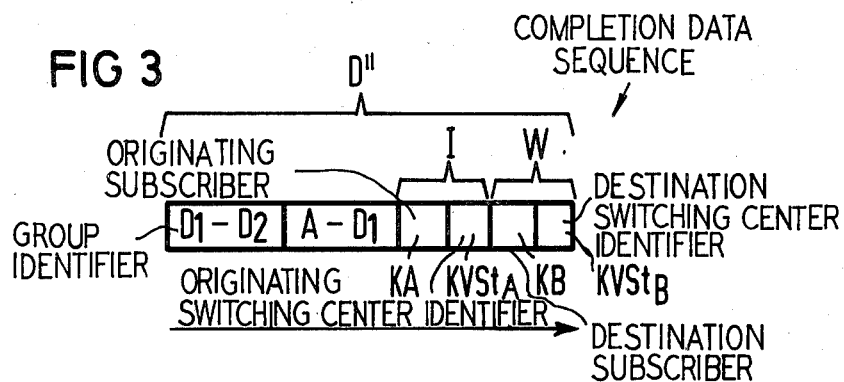
FIG. 3 schematically illustrates the format of a second completion data sequence D"

The destination switching center $VSt_B$ of the called subscriber, in particular, of the destination subscriber B, finally receives the beginning frame which contains the octets with which the traversed switching centers have successively referenced the groups to be employed, and also contains the numbers of the calling subscriber and of the called subscriber, including the numbers of the appertaining local exchanges. The switching center of the called subscriber returns the beginning frame to the switching center of the calling subscriber, characterized as an acknowledgment (FIG. 3).

The beginning frame and the acknowledgment frame have then traversed all of the switching centers. With the assistance of the subscriber numbers, these two frames can be identified in these switching centers. The information of the acknowledgment frame can be stored. Therefore, the transit switching centers can monitor the virtual connections.

Further, the virtual connection is also known to the two local exchanges. The called subscriber is called; the calling subscriber receives the call acknowledgment. After the called subscriber has accepted the call, the speech is digitally transmitted on the subscriber line.

Whereas each group in the method described up to this point is respectively locally and independently identified by the two adjacent switching centers by means of two different octets and these two octets must also be transmitted in the beginning frame and the acknowledgment frame, alternately thereto one can work with only one octet per group, this octet identifying the group as an outgoing group in one switching center and identifying the same as an incoming group in the next switching center. Therefore, 256 groups can be identified by 8 bits in the environment of the switching center. If the combinations 11111111 and 00000000 are omitted, then 254 group identifiers still remain. On the other hand, there are certainly considerably more than 254 groups in one country. The line group identifiers, therefore, must be employed in multiple. By means of a strategy, for example, similar to that which is applied to the frequencies of the channels given mobile radio in small zone networks, it must be assured that ambiguities are avoided.

It would be fundamentally conceivable to employ different paths or groups in both directions. This, however, has the advantages that a double acknowledgment must be carried out, at least in the completion of the virtual connection, and that the monitoring of a connection requires larger time constants, because, under certain conditions, relatively long speech can only be transmitted in one direction.

When a group has N speech circuits, then a switching center can be set, at most, 2N virtual connections. Thereby, it is presumed that the group exhibits at least 35 speech circuit. If it has fewer than 35 speech circuits, then an exploitation factor which is smaller than 2 must be selected.

The lines of a group must exhibit uniform properties in particular, transit times, which are as identical as possible. For example, pupin lines and carrier frequency lines or satellite and submarine lines dare not be mixed, because abrupt changes of transmission time could otherwise occur during speech.

The call state begins with acceptance of the call by the called subscriber ("picking up"), this being reported to the calling subscriber.

Figure 4:
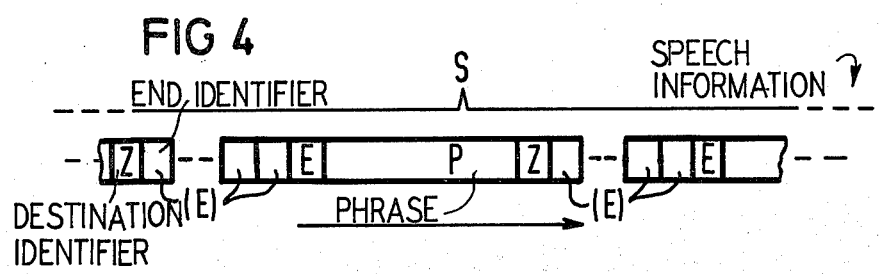
FIG. 4 schematically illustrates the format of a speech information S having individual phrases P, with a respective, preceding destination identifier sequence Z, and a terminating end identifier E.

As described in FIG. 4, the speech conversation is subdivided by the two subscriber exchanges into phrases P. (A phrase is a cohesive speech segment.) A speech detector, known per se, analyzes a digitized speech information S arriving from the subscriber and perceives the beginning of a phrase P. The encoded speech is intermediately stored for 15 ms and a destination identifier sequence Z is transmitted in this time. The destination identifier sequence Z comprises the identifier of the outgoing groups in the exchanges which the phrase P is to traverse (if one first presumes 13 exchanges following one another, then 13×8 bit=104 bit occurs), as well as comprising the number of the subscriber to be reached (i.e. called or, respectively, calling) at the local exchanges.

Two octets are attached for the number of the subscriber, but the octets 00000000 and 11111111 are not employed. Therefore, 254×254=64516 different subscriber numbers occur at the destination switching center.

When one also adds a destination beginning character to the beginning of the destination identifier sequence Z, then a maximum of 16×8 bit=128 bit occurs for the destination criterion.

Advantageously, the destination identifier sequence can be secured against errors. To this end, an additional 16 bit must be additionally added. As a rule, however, one can proceed from the fact that, on the one hand, the transmission error frequency in a digital network is sufficiently small and that, on the other hand, double connections can occasionally be accepted, even today in an analog network. As a result, a description of such protection is not included herein.

The destination beginning character is constructed in such a manner that it differs from the octet 11111111 is at least 2 bits. It specifies the plurality of octets still existing in the destination identifier sequence Z and further contains a service identifier.

Given a transmission rate of 64 kbit/s, a transmission time of 2 ms occurs for the destination identifier sequence Z. The aforementioned intermediate storage time of 15 ms arises because, in addition to the transmission time, a waiting time is also required in which it must be perceived with certainty that it is, in fact, a matter of a speech signal and not a matter of a single pop. The waiting time, however, it only required at the first switching center. Intermediate storage of only approximately 0.5 ms must be carried out at the further switching centers.

When the transmission of a phrase P has been terminated on a line, a criterion is transmitted, as an octet, which indicates the quiescent mode of the line, for example, the combination 11111111. The first octet which the first switching center transmits onto the line (selected from the proper group) to the second switching center as the beginning identifier for a phrase P is the destination beginning character and then the octet which identifies the group to the third switching center. This is followed by the octet which identifies the group to the fourth switching center until all groups up to the last switching center have been identified. The last line group identifier, for example, $D_1-B$ is followed by the number of the subscriber at the appertaining local exchange, the number consisting of 2 octets. The encoded speech signal then follows.

Instead of the combination 11111111, a few other combinations could also be employed. Thereby, it must be guaranteed that the selected combination does not occur in a data connection operated with HDLC.

After the destination beginning character, the second switching center reads only the first octet, destroys the same, reduces the information present in the destination beginning character concerning the plurality of octets in the destination identifier sequence Z by one, and transmits the destination beginning character and what follows the same onto a line of the group identified by the first octet. The following switching centers operate in the same manner. The last switching center is a pure subscriber exchange which, except for the group to the super-ordinate switching center, only has lines to subscribers. After the destination beginning character, this switching center always read only two octets, destroys the same and transmits the following onto the lines of the subscriber identified by the two octets.

The phrases P can be subdivided into parts of, for example, 8 ms (=64 octets). In this case, each phrase P comprises an arbitrary number of such parts. In the transmission, the parts are connected directly to one another. When the speech detector on the transmission side indicates that the phrase P is terminated, then at least two octets 11111111 are attached to the end of the current 8 ms part (or to one of the following 8 ms parts when the same is necessary because of the speech detection), these octets 11111111 indicating the end of the phrase P to the following switching centers. Should the analog speech signal on the transmission side coincidentally require the transmission of two octets 11111111 at the beginning of an 8 ms part, whereby a phrase end criterion would be simulated, then the first exchange alters that bit in the second octet which is the least significant, from "1" to "0". The error thus occurring in the speech transmission is rare and negligible. At the end of a phrase P, each switching center transmits octets 11111111 onto the line until it wishes to transmit a new phrase P—usually from a different dialog, i.e. for a different virtual connection. The receiving local exchange transmits octets with the significance "no speech signal" onto the subscriber line during the perceived speech pause, for example, 00000000, given pulse code modulation (PCM).

One could also decide not only to insert at least two octets 11111111 between the phrases P but, rather, a greater plurality. By so doing, it would become increasingly less probable that this combination coincidentally occurs in the speech signal and simulates a phrase end criterion. If, for example, one assumes 16 octets 11111111, one would no longer have to secure this phrase end criterion and could likewise forego the subdivision of the phrase P into 8 ms parts.

The phrases P of one dialog must all exhibit the same transmission time from subscriber-to-subscriber. Therefore, it must be guaranteed that the transmission time through a switching center is identical for all phrases P of the conversation. The transmission time is at least of the duration which is required in order to read the first line group identifier, to seek a free line, and to forward onto such line. If no line is free at the moment, then the phrase P dare not be additionally delayed. On the contrary, the first 8 ms part of the phrase is to be suppressed. The phrase P is now transmitted in the proper time, with its second 8 ms part, insofar as possible. If still no line is free, then the second 8 ms part is also suppressed and one begins in proper time with the third part, etc. In every instance, however, even given an abbreviated phrase P, the line group identifiers and the destination beginning character which are still to be worked off are placed in front. Thereby, the switching center orients itself at the destination beginning character. When there is not only two, but, rather, at least 16 octets 11111111 which are transmitted between the phrases P, then—when no line is free at the moment—only as many octets are to be suppressed when they correspond to the duration for which the phrase P must wait for a free line.

In this case, one could also forego a destination beginning character. If a phrase P cannot be relayed in a switching center because no line of the group is free at the moment, then 16 octets are always to be intermediately stored and output as soon as the line is free. Subsequently, the remainder of the phrase P is to be attached in proper time. The line group identifiers are always contained in the 16 octets.

Advantageously, the virtual connection $V_v$ can also be continued beyond the local exchange into a private branch exchange, or up to the subscriber, in that the functions speech pause recognition, formation of phrases P, and speech interpolation (given large private branch exchanges) are placed there and the completion and disconnection of the virtual connection $V_v$ is shifted to the private branch exchange or, respectively, to the subscriber.

The method specified above is practically independent of the type of speech encoding. It is not only possible to cooperate with PCM and various DPCM methods but, rather, it is also possible to expand this method to higher-level speech encoding methods in which the analog speech, depending on the instantaneous property of the speech signal, is encoded with a greater or lesser number of bits per sampling value. Given introduction of further network-uniform line rates, it would have to be possible to transmit background information instead of a speech pause, even when one encodes the signals emitted by a microphone with a small bit rate in the speech pauses.

The virtual connection $V_v$ is released or, respectively, disconnected in that the switching center of the releasing subscriber transmits a release frame which corresponds to the begin-acknowledgment frame, the release frame traversing all transit switching centers and being received and acknowledged by the switching center of the other subscriber. In succession, all switching centers cancel the corresponding memory entries.

In order to monitor a virtual connection $V_v$—as is known per se—a time function element is set to its state "zero" in each exchange at each new phrase P. When the time function element expires without a phrase P being transmitted in one of the two directions, the connection is released in that release frames are transmitted to the calling or to both subscribers.

Given speech interpolation systems, the beginning of the phrase P will be suppressed with a specific probability, because no line of the group is free at the moment. When a number of sections are connected in series, then this probability is correspondingly increased. Given connections having one or only a few sections, the probability is smaller than given connections with a great number of sections. This can be approximately compensated in that the information (always required then) in the destination beginning character concerning the octets still existing in the destination identifier sequence Z is employed as a priority identifier, i.e. phrases P having many octets are given priority in the line allotment over such phrases P which have few octets, in that, for example, a speech capacity is reversed for connections having many octets. Independently of this, the groups should not be as heavily exploited as in TASI with only one section.

Figure 2:
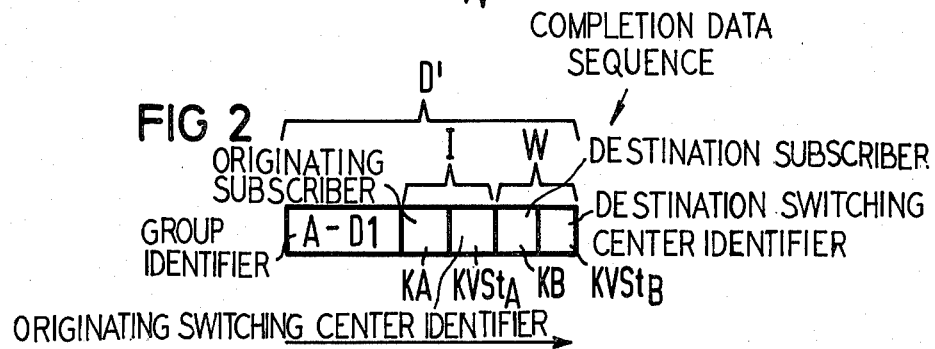
FIG. 2 schematically illustrates the format of a first completion data sequence D'.

As already explained, FIGS. 2 and 3 respectively illustrate the schematic format of a first or of a second completion data sequence D' or, respectively, D". Thereby, the dialing information W contains the destination switching center identifier $KVSt_B$ and the destination subscriber identifier KB. The identification information I contains the originating switching center identifier $KVSt_A$ and the originating subscriber identifier KA. The line group identifiers are referenced with $A-D_1$ and $D_1-D_2$.

As likewise already set forth above, FIG. 4 schematically illustrates the format of a speech information S, whereby the destination identifier sequence is referenced Z, the phrase is referenced P, and the end identifier is referenced E.

Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

I claim:

1. A telephone switching network for digital speech transmission, comprising:
    a plurality of switching centers capable of being connected in tandem between an originating subscriber terminal and a destination subscriber terminal;
    means in each of said switching centers for receiving dialing information and establishing virtual connections between the originating and destination switching centers connected to the originating and destination subscribers;
    means for subdividing the speech into speech phrases;
    means in each switching center for assigning real connections between two switching centers only for transmission of a respective speech phrase;
    means for transmitting a speech phrase in the form of a digital information section in real time over the real connection including a destination identifier indicating the virtual partial connections to be traversed, the digitized speech phrase and an end identifier indicating the end of the digitized speech phrase;
    means for releasing the established real connection after termination of transmission of an information section; means for disconnecting the virtual connection upon termination of a call;
    means for subdividing said digital speech phrases, by rastering, into predetermined intervals or time slots corresponding to 64 octets, each phrase corresponding to an arbitrary number of successive time slots; and
    means in said switching centers for suppressing integer time slots of a phrase when no real connection is available and transmitting in real time the remainder of the phrase at the beginning of a new unsuppressed time slot in response to a real connection becoming available.

2. The network of claim 1, and further comprising:
    lines and line groups connecting said plurality of switching centers;
    routing means in each of said switching centers responsive to dialing information including a destination identifier to select a line group containing free lines for connection to the next switching center with the aim to establish the virtual connection;
    completion data means in each of said switching centers for transmitting a completion data sequence to the next switching center, said completion data sequence including the dialing information in the form of a destination switching center identifier, a destination subscriber identifier, an originating switching center identifier, an originating subscriber identifier, and a line group identifier identifying the selected line group, said completion data means including means responsive to receipt of a completion data sequence from another switching center to add a line group identifier to the completion data sequence received to identify the line group selected by its own routing means to the next switching center;

acknowledgment means in each of said switching centers for receiving and storing the completion data sequence and responsive to its identification as the destination switching center to transmit an acknowledgment message back through the network to the originating switching center, the acknowledgment message containing the completion data sequence constructed up to the destination switching center;

storage means in each of said switching centers for storing the acknowledgment message to thereby identify all connections established; and real connection release means in each of said switching centers responsive to the storage of a completion data sequence and an acknowledgment signal respectively to release the appertaining real connections.

3. The network of claim 1, and further comprising:
at the respective transmitting side, a speech detector responsive to speech pauses to form the digitized speech phrases.

4. The network of claim 1, and further comprising:
phrase storage means operable in a switching center operating as an originating switching center and in a switching center operating as a destination switching center for intermediately storing the speech phrases for a predetermined interval sufficient for the production and inclusion of the destination identifier sequence in front of the respective phrase for transmission.

5. The network of claim 4, wherein said predetermined time is selected sufficiently large so that a distinction may be made between speech and popping noises.

6. The network of claim 1, and further comprising:
at the respective transmitting side, a speech detector responsive to speech pauses to form the digitized speech phrases; and
means for perceiving the end of each speech phrase and transmitting quiescent character octets between the speech phrases.

7. The network of claim 6, wherein: said means for transmitting quiescent character octets comprises means for forming the octet 11111111.

8. The network of claim 6, wherein said means for transmitting a quiescent character includes means for transmitting at least two octets of the quiescent character as an end identifier for the appertaining speech phrase.

9. The network of claim 6, wherein: each of the originating and destination switching centers includes means for continuing the quiescent character at the end of a respective phrase including means for detecting a new phrase and terminating continuing of the quiescent character.

10. The network of claim 8, wherein: each of the switching centers operating as a receiving local exchange comprises means for identifying a speech pause and producing a pause identifier as an octet onto the subscriber line connected thereto during a speech pause.

11. The network of caim 10, wherein said means for detecting and generating a pause identifier is operable to emit as the identifier the octet 00000000.

12. The network according to claim 1, and further comprising:
means in said switching centers for storing, in response to a real connection not being available, the 16 first octets of a current phrase and, responsive to a connection becoming available, transmitting the stored 16 octets and including the current unsuppressed slots of the phrase in real time with the time slots.

13. The network of claim 12, and further comprising:
means in said switching centers for determining the priority of a phrase having an above-average plurality of octets in the destination identifier sequence for establishing priority with respect to the current assignment of a real connection.

14. The network of claim 13, and further comprising:
means in said switching centers for providing a destination begin character including length of destination information at the beginning thereof.

15. The network of claim 14, wherein:
said means for providing a destination begin character includes means for producing a destination identifier sequence which differs from the octet 11111111 in at least two bits.

16. The network of claim 15, wherein:
said means for providing a destination begin character includes means for producing a service identifier within the destination identifier sequence.

17. The network of claim 2, wherein said completion data means comprises:
means for providing a parity bit in the completion data sequence.

18. The network of claim 17, wherein said completion data means comprises:
means in said switching centers for providing for a destination identifier sequence concerning a plurality of octets, reducing the instruction by one after use and then destroying an octet.

19. The network of claim 2, wherein said completion data means comprises:
means for producing a destination subscriber identifier and an originating subscriber identifier respectively of two octets excluding the octets 00000000 and 11111111.

20. The network of claim 2, wherein said completion data means comprises:
means for producing a line group identifier including two octets.

21. The network of claim 2, and further comprising:
a direct inward dialing private automatic branch exchange connected to the destination switching center and having an extended virtual connection established thereto.

* * * * *